United States Patent
Kilian et al.

(10) Patent No.: US 7,516,277 B2
(45) Date of Patent: *Apr. 7, 2009

(54) CACHE MONITORING USING SHARED MEMORY

(75) Inventors: Frank Kilian, Mannheim (DE); Christian Fleischer, Mannheim (DE); Petio Petev, Sofia (BG)

(73) Assignee: SAP AG, Walldorf (DE)

( * ) Notice: Subject to any disclaimer, the term of this patent is extended or adjusted under 35 U.S.C. 154(b) by 398 days.

This patent is subject to a terminal disclaimer.

(21) Appl. No.: 11/118,259

(22) Filed: Apr. 28, 2005

(65) Prior Publication Data

US 2006/0248276 A1 Nov. 2, 2006

(51) Int. Cl.
*G06F 12/00* (2006.01)

(52) U.S. Cl. .................. 711/130; 711/118; 711/147

(58) Field of Classification Search .................. None
See application file for complete search history.

(56) References Cited

U.S. PATENT DOCUMENTS

| | | | |
|---|---|---|---|
| 5,682,328 A | 10/1997 | Roeber et al. | |
| 5,905,868 A | 5/1999 | Baghai et al. | |
| 5,951,643 A | 9/1999 | Shelton et al. | |
| 6,199,179 B1 | 3/2001 | Kauffman et al. | |
| 6,272,598 B1 | 8/2001 | Arlitt et al. | |
| 6,438,654 B1 | 8/2002 | Elko et al. | |
| 6,467,052 B1 | 10/2002 | Kaler et al. | |
| 6,519,594 B1 | 2/2003 | Li | |
| 6,591,347 B2 | 7/2003 | Tischler et al. | |
| 6,651,080 B1 | 11/2003 | Liang et al. | |
| 6,738,977 B1 | 5/2004 | Berry et al. | |
| 6,795,856 B1 | 9/2004 | Bunch | |
| 6,996,679 B2 | 2/2006 | Cargnoni et al. | |
| 7,124,170 B1 | 10/2006 | Sibert | |
| 7,155,512 B2 | 12/2006 | Lean et al. | |
| 7,194,761 B1 | 3/2007 | Champagne | |
| 7,296,267 B2 | 11/2007 | Cota-Robles et al. | |
| 7,418,560 B2 | 8/2008 | Wintergerst | |
| 2002/0046325 A1 | 4/2002 | Cai et al. | |
| 2002/0052914 A1 | 5/2002 | Zalewski et al. | |
| 2002/0083166 A1* | 6/2002 | Dugan et al. ............... 709/223 |
| 2002/0169926 A1 | 11/2002 | Pinckney et al. | |

(Continued)

FOREIGN PATENT DOCUMENTS

WO    WO-0023898    4/2000

OTHER PUBLICATIONS

"6570P216 OA Mailed Jan. 24, 2008 for U.S. Appl. No. 11/024,393", Whole Document.
"EP 05027361, European Search Report", (Mar. 28, 2006), Whole Document.
Notice of Allowance mailed Jul. 28, 2008 for U.S. Appl. No. 11/024,651.
Notice of Allowance mailed Aug. 21, 2008 for U.S. Appl. No. 11/024,591.
White Paper: 'Using Rules-based Object Caching', spiritsoft/spiritcache 4.0 2004, 8.

(Continued)

*Primary Examiner*—Reginald G Bragdon
*Assistant Examiner*—Eric Loonan
(74) *Attorney, Agent, or Firm*—Blakely Sokoloff Taylor & Zafman

(57) ABSTRACT

A system and method to monitor caches of at least one Java virtual machine ("JVM"). A program is operated on the at least one JVM. Objects associated with the program are cached within a local cache of the JVM. Cache status information about the local cache is generated and then the cache status information is reported into memory external to the JVM to enable monitoring of the local cache from external to the JVM.

16 Claims, 7 Drawing Sheets

U.S. PATENT DOCUMENTS

| | | |
|---|---|---|
| 2003/0009533 A1 | 1/2003 | Shuster |
| 2003/0023827 A1 | 1/2003 | Palanca et al. |
| 2003/0028671 A1 | 2/2003 | Mehta et al. |
| 2003/0084248 A1 | 5/2003 | Gaither et al. |
| 2003/0084251 A1 | 5/2003 | Gaither et al. |
| 2003/0088604 A1 | 5/2003 | Kuck et al. |
| 2003/0097360 A1* | 5/2003 | McGuire et al. ............... 707/8 |
| 2003/0131286 A1 | 7/2003 | Kaler et al. |
| 2003/0229760 A1 | 12/2003 | Doyle et al. |
| 2004/0168029 A1 | 8/2004 | Civlin |
| 2004/0205299 A1 | 10/2004 | Bearden |
| 2005/0044301 A1 | 2/2005 | Vasilevsky et al. |
| 2005/0060704 A1 | 3/2005 | Bulson et al. |
| 2005/0086656 A1 | 4/2005 | Whitlock et al. |
| 2005/0086662 A1 | 4/2005 | Monnie et al. |
| 2005/0262181 A1 | 11/2005 | Schmidt et al. |
| 2005/0262493 A1 | 11/2005 | Schmidt et al. |
| 2005/0262512 A1 | 11/2005 | Schmidt et al. |
| 2006/0070051 A1 | 3/2006 | Kuck et al. |
| 2006/0092165 A1 | 5/2006 | Abdalla et al. |
| 2006/0136667 A1 | 6/2006 | Shultz et al. |
| 2006/0143389 A1 | 6/2006 | Kilian et al. |
| 2006/0143392 A1 | 6/2006 | Petev et al. |
| 2007/0266305 A1 | 11/2007 | Cong et al. |

OTHER PUBLICATIONS

"All Classes", http://www.jdocs.com/osche/2.0.2/api/com/opensymphony/oscache/base/allclases-frame.html. (Jan. 2004), 1.

"Caching with IBM WebSphereMQ", *spiritcache, Use Case & Code Example*, article, (Nov. 19, 2004), 1-9.

"Class AbstractCacheAdministrator", http://www.jdocs.com/osche/2.0.2/api/com/opensymphony/oscache/base/AbstractCache.html, (Jan. 2004), 1-11.

"Shared disk I/O cache", *IP.com Journal, IP.com Inc.*, West Henrietta, XP013014199 ISSN: 1533-0001, (Jan. 29, 2004), 6.

Bortvedt, Jerry, "Functional Specification for Object Caching Service for Java (OCS4J), 2.0", (Aug. 9, 2000), pp. 1-27.

European Seacrh Report, "Common Cache Management in a Plurality of Virtual Machines", European Patent Application No. 05028446.2-2201, European Search Report dated Dec. 4, 2007, mailed Dec. 20, 2007, 7 pgs.

Galchev, Galin, et al., "Plug-In Based Cacching Architecture Capable Of Implementing Multiple Cache Regions Per Applications", U.S. Appl. No. 11/024,554, filed Dec. 28, 2004—Final Office Action mailed Oct. 29, 2007 with claims as they currently stand, pp. 1-7 and pp. 1-6.

Galchev, Galin, et al., "Plug-In Based Caching Architecture Capable Of Implementing Multiple Cache Regions Per Application", 6570P201 U.S. Appl. No. 11/024,554, filed Dec. 28, 2004, May 28, 2008, mail date.

JSR 107: Jcache, "JSR 107: Jcache", *Java Temporary Caching API, Website*, http://web1.jcp.org/en:jsr/detail?id=107, (Nov. 28, 2004), 4.

Kilian, Frank, et al., "Common Cache Management in a Plurality of Virtual Machines", U.S. Appl. No. 11/025,482, filed Dec. 28, 2004—Non-Final Office Action mailed Apr. 17, 2008, 15 pgs.

Kilian, Frank, et al., "Common Cache Management in a Plurality of Virtual Machines", U.S. Appl. No. 11/025,482, filed Dec. 28, 2004—Non-Final Office Action mailed Feb. 27, 2007, 15 pgs.

Kilian, Frank, et al., "Common Cache Management in a Plurality of Virtual Machines", U.S. Appl. No. 11/025,482, filed Dec. 28, 2004—Final Office Action mailed Jul. 10, 2007, 17 pgs.

N/A, "Hierarchy For Package Oracle.ias.cache", http://download-west.oracle.com/docs/cd/B15904_01/web.1012/b14018/oracle/ias/cache/p..., (Nov. 2004), 2.

N/A, "JCS Plugin Overview", http://jakarta.apache.org/jcs/Plugins.html, (Jul. 2004), 2.

Pawlan, Monica, "Reference Objects and Garbage Collection", *Sun Microsystems*, (Aug. 1998), 8, 15 and 16.

Penchikala, Srini, "Object Caching In A Web Portal Application Using JCS", http://www.onjava.com/pub/a/onjava/2003/12/23/caching.html, (Dec. 23, 2003), 18.

Petev, Petio G., et al., "First In First Out Eviction Implementation", U.S. Appl. No. 11/024,546, filed Dec. 28, 2004—Final Office Action mailed Oct. 3, 2007 with claims as they currently stand., pp. 1-13 and pp. 1-8.

Petev, Petio G., et al., "First in First Out Eviction Implementation", 6570P255 U.S. Appl. No. 11/024,546, filed Dec. 28, 2004, The Office Action mailed Apr. 6, 2007, claims as they stood in the application prior to the mailing of the Office Action an cl, (Dec. 28, 2004), Whole Document.

Petev, Petio G., "First in First Out Eviction Implementation", U.S. Appl. No. 11/024,546, filed Dec. 28, 2004—Non-Final Office Action mailed Mar. 17, 2008, 18 pgs.

Petev, Petio G., et al., "Least Frequently Used Eviction Implementation", U.S. Appl. No. 11/024,565, filed Dec. 28, 2004, Non-Final Office Action mailed Oct. 25, 2007 with claims as they currently stand., pp. 1-14 and pp. 9-15.

Petev, Petio G., et al., "Least Recently Used Eviction Implementation", U.S. Appl. No. 11/024,524, filed Dec. 28, 2004—Non-Final Office Action Mailed Oct. 22, 2007 with Claims as they currently stand., pp. 1-12 and pp. 1-7.

Petev, Petio G., "Programming Models for Storage Plug-Ins", U.S. Appl. No. 11/024,651, filed Dec. 28, 2004—Non-Final Office Action mailed Mar. 14, 2008, 11 pgs.

Petev, Petio G., et al., "Programming Models for Storage Plugins", U.S. Appl. No. 11/024,651, filed Dec. 28, 2004—Final Office Action mailed Oct. 9, 2007 with claims as they currently stand, pp. 1-8 and pp. 2-8.

Petev, Petio G., "Size Based Eviction Implementation", U.S. Appl. No. 11/024,591, filed Dec. 28, 2004—Non-Final Office Action dated Mar. 11, 2008, 15 pgs.

Petev, Petio, et al., "Size Based Eviction Implementation", 6570P254 U.S. Appl. No. 11/024,591, filed Dec. 28, 2004, Mar. 11, 2008, mail date.

Petev, Petio G., et al., "Size Based Eviction Implementation", U.S. Appl. No. 11/024,591, filed Dec. 28, 2004—Final Office Action mailed Oct. 10, 2007 with claims as they currently stand., pp. 1-13 and pp. 1-8.

Purdy, Cameron, et al., "JCP Specification Participation Agreement Version in Use: 1.0", http://web1.jcp.org/en/jsr/detail?id=107 Nov. 28, 2004, pp. 1-4.

Smits, Thomas, "Unbreakable Java—The Java Server that Never Goes Down", Article, *SAP TechED*, Nov. 2004, San Diego and Munich, (Nov. 2004), 1-5.

USPTO, "6570P214 OA Mailed Jun. 27, 2008 for U.S. Appl. No. 11/024,391", Whole Document.

USPTO, "6570P216 FOA Mailed Aug. 6, 2008 for U.S. Appl. No. 11/024,393", Whole Document.

USPTO, "6570P222 FOA Mailed Sep. 17, 2008 for U.S. Appl. No. 11/024,392", Whole Document.

Veldema, et al., Runtime Optimizations for Java DSM Implementation, *Proceedings of the 2001 joint ACM-ISCOPE conference on Java Grande*[online]2001, http://delivery.acm.org/10.1145/380000/376842/p153-veldema.pdf?key1=376842&key2=2893403811&coll=GUIDE&dl=GUIDE&CFID=26913973&CFTOKEN=12550, (2001).

Wintergerst, Michael, et al., "Programming Models For Eviction Policies", U.S. Appl. No. 11/025,178, filed Dec. 28, 2004—Final Office Action mailed Feb. 20, 2008 with copy of claims as they currently stand., pp 1-8 and pp. 1-8.

USPTO, "6570P222 OA Mailed Apr. 4, 2008 for U.S. Appl. No. 11/024,392", Whole Document.

USPTO, "6570P176 OA Mailed Oct. 29, 2008 for U.S. Appl. No. 11/025,482", Whole Document.

Wang, Ben, "Enter the JBoss Matrix", *JBossCache 1.0 Released* [online] [retrieved on Oct. 24, 2008] Retrieved from the Internet<URL:http://blogs.jboss.corri/blog/nfleury/2004/03/25/JBossCache+1.0+Released.html>, (Mar. 25, 2004).

* cited by examiner

| CACHE STATUS INFO | DESCRIPTION |
|---|---|
| ID | PROCESS ID OF WORKER NODE |
| TYPE | CACHE TYPE (SHARED OR LOCAL) |
| SIZE | TOTAL SIZE OF CACHED OBJECTS (BYTES) |
| ATTRIBUTES_SIZE | TOTAL SIZE OF CACHED OBJECTS' ATTRIBUTES (BYTES) |
| KEYS_SIZE | TOTAL SIZE OF CACHED OBJECTS' KEYS (BYTES) |
| COUNT | TOTAL NUMBER OF CACHED OBJECTS |
| PUTS | TOTAL NUMBER OF "PUT" OPERATIONS EXECUTED |
| MODIFICATIONS | NUMBER OF "PUT" OPERATIONS THAT HAVE BEEN MODIFIED (SUCCESSIVE "PUTS" WITH SAME KEY) |
| REMOVALS | TOTAL NUMBER OF "REMOVE" OPERATIONS EXECUTED |
| EVICTIONS | TOTAL NUMBER OF "EVICTION" OPERATIONS EXECUTED |
| UTILIZATION | MAXIMUM VALUE OF "COUNT" VARIABLE REACHED |
| GETS | TOTAL NUMBER OF "GET" OPERATIONS EXECUTED |
| CACHE_HITS | TOTAL NUMBER OF SUCCESSFUL "GET" OPERATIONS EXECUTED |
| UPDATE_TIME | LAST UPDATE TIMESTAMP |
| NAME | CACHE NAME |

CACHE MONITORING USING SHARED MEMORY

TECHNICAL FIELD

This disclosure relates generally to monitoring JAVA™ virtual machines, and in particular but not exclusively, relates to monitoring caches within JAVA™ virtual machines using shared memory.

BACKGROUND INFORMATION

Enterprise software has transformed the way diverse enterprises, large and small a like, transact and manage day-to-day operations. Businesses use enterprise software (e.g., web based application servers) to control production planning, purchasing and logistics, warehouse and inventory management, production, vendor management, customer service, finance, personnel management, and other basic business activities. As the enterprise software industry continues to mature, the various application and hardware resources enlisted to facilitate this diverse set of tasks are being amalgamated into robust, highly integrated solutions (e.g., SAP® NETWEAVER®, SAP® XAPPS®, MYSAP™ Business Suite, etc.).

To integrate diverse hardware and software resources, developers of enterprise software have leveraged cross platform engines capable of minimizing or even severing platform dependencies from the enterprise solution. The JAVA™ 2 Platform, Enterprise Edition™ ("J2EE™") (e.g., J2EE™ Specification, Version 1.4) is a JAVA™ based solution supported by the JAVA™ Virtual Machine ("JVM™") engine. J2EE™ simplifies application development and decreases the need for programming and programmer training by creating standardized and reusable modular components. The popularity of JAVA™ based solutions is evident as the Information Technology ("IT") world has gravitated to the JAVA™ language.

As enterprise software is woven into the fabric of modem business, failure of an enterprise solution may no longer be a mere nuisance, but has the potential to wreak catastrophic havoc on a business. As such, robust, reliable software is evermore critical. The enterprise software industry is marching toward the ultimate goal of self-healing software capable of sustainable, uninterrupted operation, without human intervention. In pursuit of this goal, IT technicians can benefit from convenient tools capable of monitoring the health of their enterprise software. With appropriate monitoring tools, IT technicians can take appropriate action in a timely manner to ensure a healthful state of their software or to spot delinquent applications and prevent repeat offenders. Currently JVM™s do not provide adequate mechanisms to monitor their internal operation on a real-time basis.

SUMMARY OF INVENTION

A system and method to monitor caches of at least one JAVA™ virtual machine ("JVM™") is described herein. A program is operated on the at least one JVM™. Objects associated with the program are cached within a local cache of the JVM™. Cache status information about the local cache is generated and then the cache status information is reported into memory external to the JVM™ to enable monitoring of the local cache from external to the JVM™.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 4 illustrates a table that depicts cache status information that may be stored within cache monitoring tables of a shared memory, in accordance with an embodiment of the invention.

DETAILED DESCRIPTION

Figure 1:
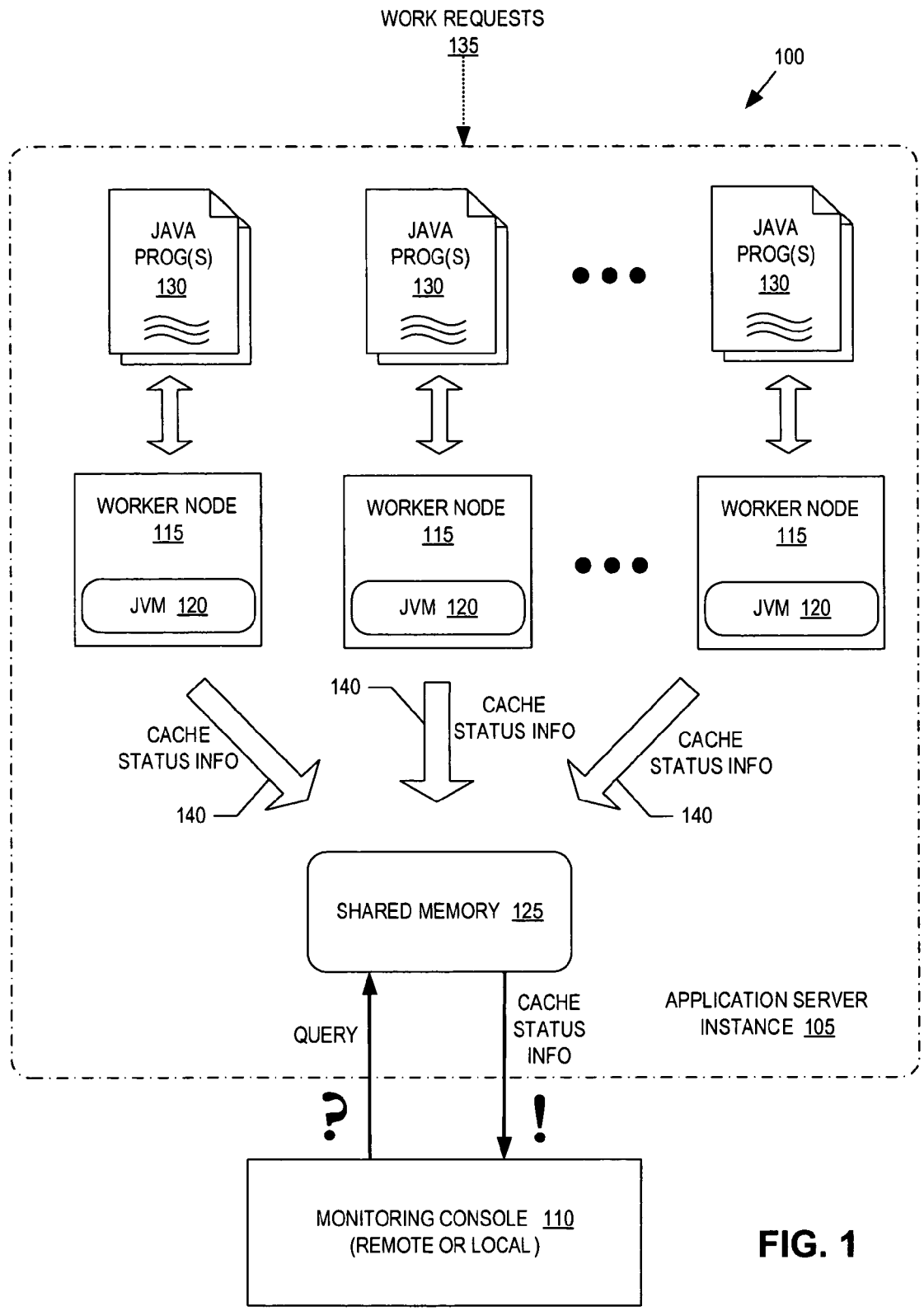
FIG. 1 is a block diagram illustrating a software system for monitoring local and shared caches of one or more JAVA™ virtual machines of an application server instance, in accordance with an embodiment of the invention.

FIG. 1 is a block diagram illustrating a software system 100 for monitoring local and shared caches of one or more JAVA™ virtual machines ("JVM™s") of an application server ("AS") instance 105, in accordance with an embodiment of the invention. The illustrated embodiment of software system 100 includes AS instance 105 and a monitoring console 110. The illustrated embodiment of AS instance 105 includes one or more worker nodes 115 each including a JVM™ 120 and shared memory 125. JAVA™ worker nodes 115 provide the runtime environment for JVM™s 120, which in turn interpret/execute JAVA™ programs 130.

Collectively, JAVA™ programs 130 may provide the logic for implementing various sub-layers (e.g., business layer, integration layer, presentation layer, etc.) of AS instance 105. In one embodiment, AS instance 105 is a web application server, such as Web AS by SAP, .NET™ by Microsoft, or the like. In one embodiment, AS instance 105 represents a JAVA™ 2 Platform, Enterprise Edition ("J2EE™") instance for providing enterprise software functionality. It should be appreciated that various components of AS instance 105 have been excluded from FIG. 1 for the sake of clarity and so as not to obscure the invention. Although FIG. 1 illustrates three worker nodes 115 within AS instance 105, more or less worker nodes 115 may be established within AS instance 105.

During operation, work requests 135 may be received at AS instance 105 and assigned to any of worker nodes 115 for servicing. JVM™s 120 within each worker node 115 may execute JAVA™ programs 130 containing logic for servicing the received work requests 135. While servicing work requests 135, JAVA™ programs 130 may establish local caches within each JVM™ 120 to cache recently used or commonly used objects created during their operation. Each time a cache operation is performed by one of JAVA™ programs 130, a cache manager or cache monitor may update shared memory 125 with cache status information 140 in response thereto. Accordingly, as worker nodes 115 services work requests, cache status information 140 is updated within shared memory 125 in real-time.

Once cache status information 140 is reported into shared memory 125, monitoring console 110 can query shared monitoring memory 125 to display cache status information 140 for review by an Information Technology ("IT") technician. Monitoring console 110 may be located locally on the same hardware machine executing AS instance 105 or executed on a remote machine couple to a network. Monitoring console 110 may further monitor an entire cluster of AS instances 105, all from a single remote machine. Using monitoring console 110, the IT technician can remotely monitor the status and operational health of JAVA™ applications 130, JVM™s 120 and their associated caches in real-time to ensure AS instance 105 remains in a healthful state. Shared memory 125 working in concert with monitoring console 110, enables the IT technician to make informed decisions when taking preventative and/or remedial action to effectively maintain and manage an enterprise system.

Figure 2:
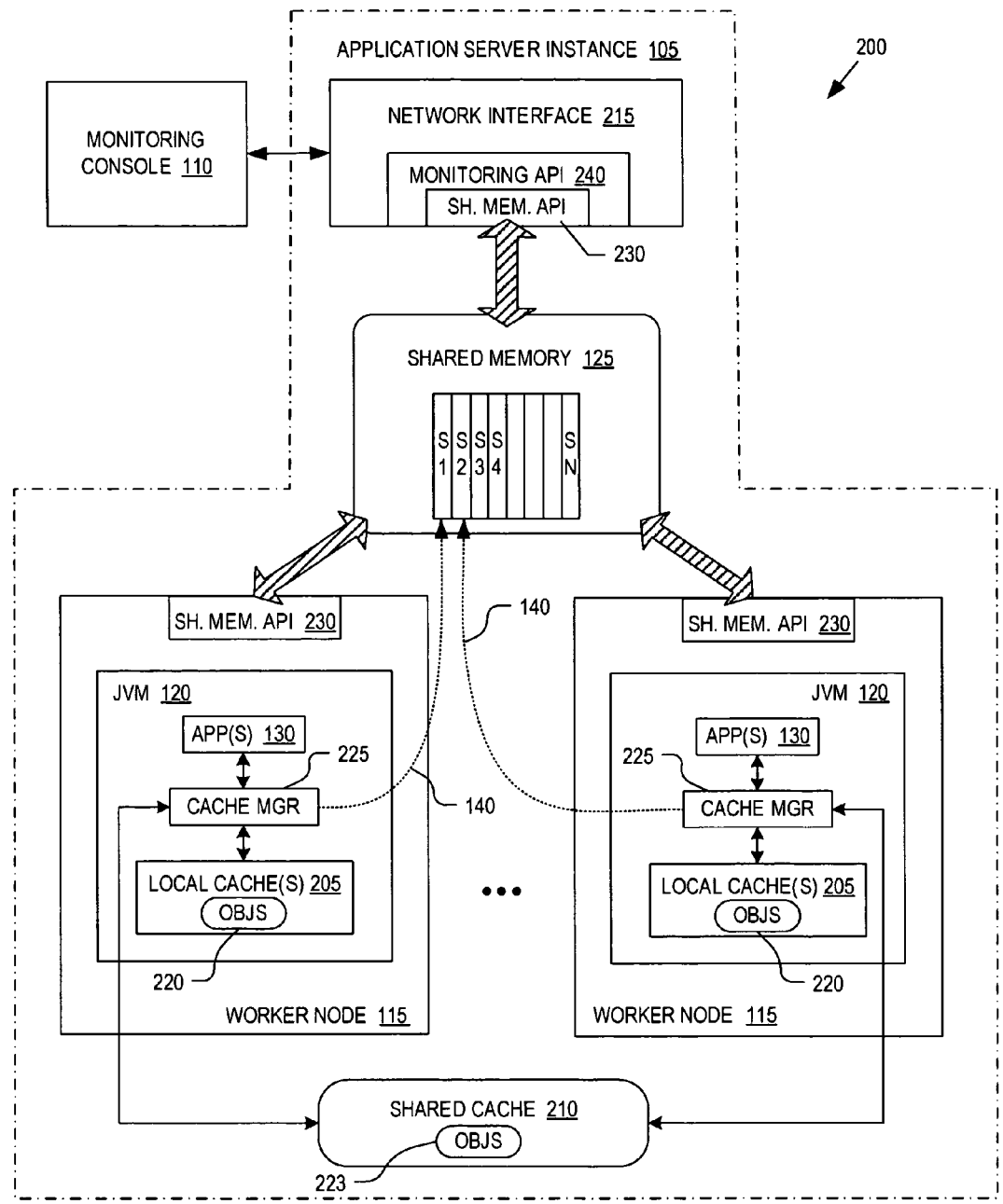
FIG. 2 is a block diagram illustrating a software system for storing cache status information into shared memory and reporting the cache status information to a monitoring console, in accordance with an embodiment of the invention.

FIG. 2 is a block diagram illustrating a software system 200 including AS instance 105 for monitoring local caches 205 and a shared cache 210, in accordance with an embodiment of the invention. FIG. 2 provides further details of AS instance 105, including a network interface 215, as well as, worker nodes 115 and shared memory 125. As illustrated, each worker node 115 includes a JVM™ 120 one or more local caches 205, cached objects 220 and 223, a cache manager 225, and a share memory application programming interface ("API") 230.

In one embodiment, cache manager 225 provides a cache implementation with a variety of functionality and services. Applications 130 may create a local cache 205 or shared cache 210 for their cached objects 220 and 223 with the aid of cache manager 225. In one embodiment, cache manager 225 may include a cache region factory for creating local or shared cache regions, which may then be populated with cached objects 220 and 223. In one embodiment, cache manager 225 may implement a user API which provides an abstraction interface for applications 130 to access their cached objects 220 and 223. In one embodiment, cache manager 225 may include a cache monitor for reporting cache status information 140 into shared memory 125. An embodiment, of cache manager 225 is discussed in detail below with reference to FIG. 3.

During operation of JVM™s 120 (e.g., while servicing work requests 135), applications 130 may access local caches 205 or shared cache 210 via a variety of access methods or operations (e.g., PUT, GET, REMOVE, EVICT, MODIFY, etc.). In response to each of these access operations, the cache monitoring functionality of cache manager 225 updates shared memory 125 with new cache status information 140 to reflect the recent activity. Accordingly, cache manager 225 may report/publish cache status information 140 into shared memory 125 on an event basis, although cache manager 225 may also report status information 140 into shared memory 125 on a periodic basis. Event based reporting of cache access operations saves time and processing cycles that may otherwise be wasted pulling each cache for updated cache status information 140 that may or may not yet exist.

In one embodiment, cache manager 225 is one or more JAVA™ entities (e.g., JAVA™ objects) interpreted and executed by JVM™s 120. In one embodiment, the access methods (e.g., PUT, GET, REMOVE, EVICT, MODIFY, etc.) are instrumented with reporting functionality. Each time one of these instrumented access methods is called, the reporting functionality may be executed subsequent to the cache access operation or in an interleaving manner with the cache access operation. Accordingly, in one embodiment, shared memory 125 is updated with current cache status information 140 in real-time while applications 130 are operating within JVM™s 120.

Shared memory 125 is referred to as "shared" in the sense that multiple JVM™s 120 are capable of reporting cache status information 140 thereto and shared memory 125 is not private memory within a single JVM™ 120 (such as local caches 205). Accordingly, if one of JVM™s 120 fails or one of caches 205 becomes irretrievably corrupted, cache status information 140 is safeguarded within shared memory 125 external to JVM™s 120 for postmortem investigation. In one embodiment, shared memory 125 includes reporting slots S1-SN. Each reporting slot may be registered by a cache manager 225 upon creation of a new local cache 205 or shared cache 210 at the behest of applications 130 (or other JAVA™ entities operating within JVM™ 120). Each reporting slot S1-SN may store a cache monitoring table warehousing the cache status information 140 corresponding to a particular local cache 205 or shared cache 210. Accordingly, in one embodiment, there is a one-to-one correspondence between reporting slots S1-SN and monitored caches (e.g., local and shared caches 205 and 210). Upon deletion of a local or shared cache 205 or 210, its corresponding reporting slot S1-SN may be cleaned and recycled for use to store cache status information 140 of a subsequently created cache.

Cache manager 225 accesses shared memory 125 via shared memory API 230. Shared memory API 230 acts as a global hook to extricate cache status information 140 from within JVM™s 120 (the interpreted JAVA™ language realm) to the native language realm (e.g., OS runtime language such as C++ or the like). In one embodiment, shared memory API 230 abstracts access to shared memory 125 through use of function calls. When the reporting functionality of cache manager 225 wishes to report cache status information 140 into shared memory 125, it makes a "call" to one or more functions published internally to worker nodes 115 by shared memory APIs 230. The reporting functionality then passes cache status information 140 to the called function. In turn, the called function copies cache status information 140 into an appropriate reporting slot S1-SN.

In one embodiment, monitoring console 110 transmits status queries to network interface 215 to request cache status information 140, or a portion thereof. Monitoring console 110 can be implemented using the Microsoft Management Console ("MMC"), while network interface 215 may be implemented with a WebService based Start Service. In one embodiment, the status queries are conveyed to network interface 215 using a message based protocol, such as Simple Object Access Protocol ("SOAP") employing extensible markup language ("XML") syntax to send text commands over the HyperText Transport Protocol ("HTTP"). The status query may be transmitted to AS instance 105 automatically on a periodic basis, in response to a specified event, or in response to a screen refresh request by an IT technician.

Upon receipt, the status query is passed to a monitoring API 240. Monitoring API 240 accesses the requested portions of shared memory 125 via its own copy of shared memory API 230. Once monitoring API 240 retrieves the requested portions of cache status information 140 from shared memory 125, cache status information 140 is conveyed to monitoring console 110. In one embodiment, XML syntax is used to convey cache status information 140 to monitoring console 110.

Monitoring console 110 may further format the received cache status information 140 and render it to a screen for review by an IT technician. Monitoring console 110 may display cache status information 140 received from a number of AS instances 105 to monitor an entire cluster of AS instances 105. Monitoring console 110 may further optionally generate log files to maintain long-term status reports on each AS instance 105 being monitored.

In addition to issuing status requests, monitoring console 110 may negotiate a reporting contract with network interface 215 to serve up cache status information 140 on a regular or periodic basis, without need of status requests. As such, network interface 215 may be capable of pushing cache status information 140 to monitoring console 110, as well as, monitoring console 110 capable of pulling cache status information 140 from network interface 215.

Figure 3:
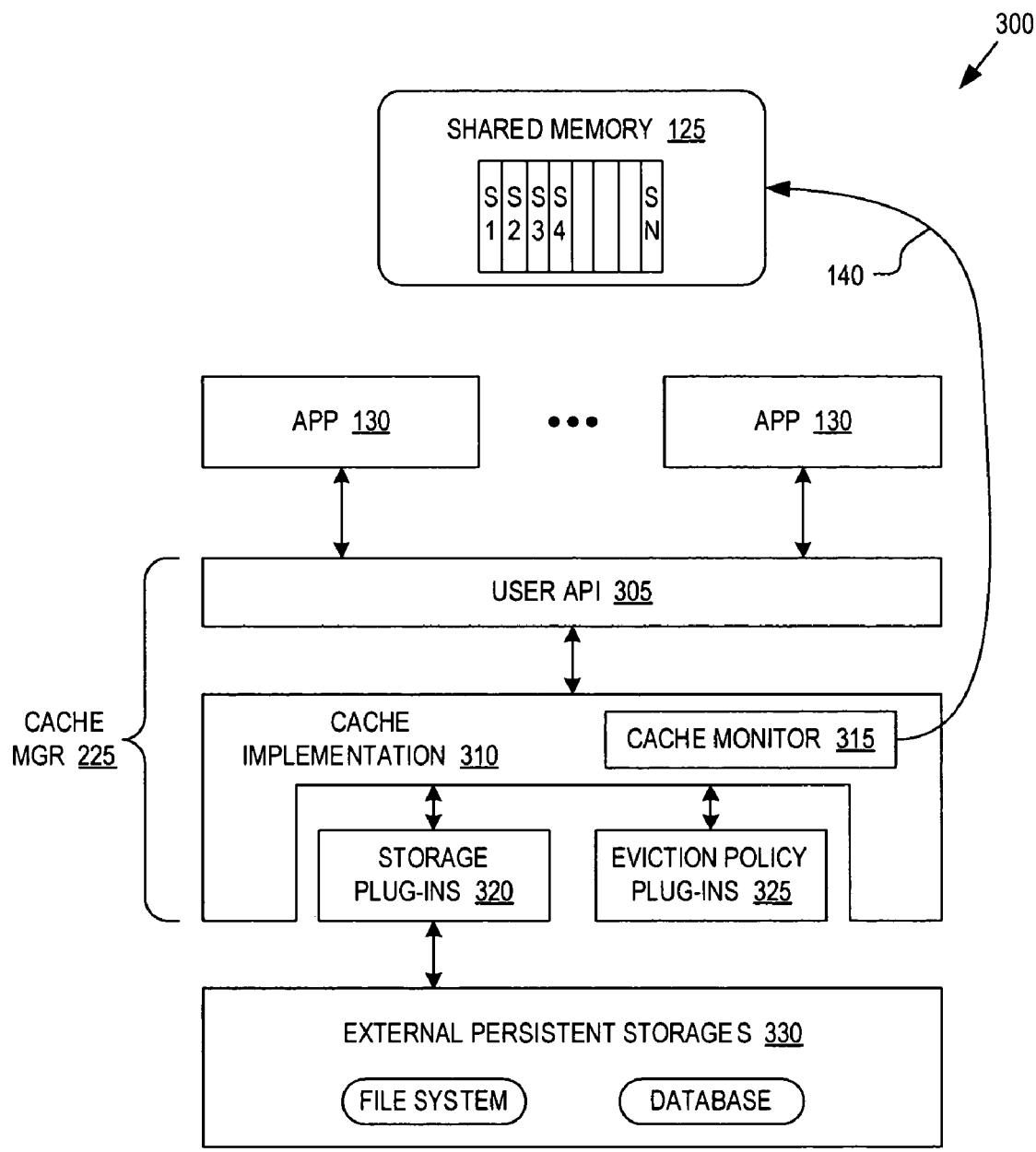
FIG. 3 is a block diagram illustrating a software architecture of a cache manager for monitoring caches of a JAVA™ virtual machine, in accordance with an embodiment of the invention.

FIG. 3 is a block diagram illustrating a software architecture 300 including cache manager 225 for monitoring local and shared caches 205 and 210, in accordance with an embodiment of the invention. FIG. 3 illustrates one possible embodiment of cache manager 225. The illustrated embodiment of cache manager 225 includes a user API 305, a cache implementation 310, a cache monitor 315, storage plug-ins 320, eviction policy plug-ins 325, and external persistent storages 330.

The illustrated embodiment of cache manager 225 may be split into two logical layers. User API 305 and cache implementation 310 together form a first logical layer or frontend which is used by applications 130 to access their cached objects 220 and 223. Storage plug-ins 320 and eviction policy plug-ins 325 form a second logical layer or backend that is invisible to applications 130. In one embodiment, cache monitor 315 may be thought of as a functional component of cache implementation 310 and is responsible for reporting cache status information 140 into shared memory 125 as described above. In one embodiment, cache monitor 315 simply represents code instrumented into each cache access method or operation for reporting cache status information 140 into shared memory 125. Storage plug-ins 320 are responsible for storing and maintaining cached objects 220 and 223 within local caches 205 and/or shared cache 210. Storage plug-ins 320 may also serialize cached objects 220 and 223 for external storage to external persistent storages 330 (e.g., a database, a file system, etc.). Eviction policy plug-ins 325 are responsible for selecting which cached objects 220 or 223 are to be evicted or removed from local caches 205 or shared cache 210 due to threshold exceeding. A threshold may be exceeded if the SIZE of all cached objects within a particular cache exceeds a threshold or if the COUNT of the total number of cached objects within a particular cache exceeds a threshold. Other threshold mechanisms may be implemented as well.

In one embodiment, each time a cached object 220 or 223 is accessed (e.g., GET, PUT, EVICT, REMOVE, MODIFY, serialize to external persistent storages 330, etc.) cache monitor 315 is notified by the relevant entity, and in response, cache monitor 315 updates the appropriate reporting slot S1-SN of shared memory 125 to reflect the recent cache activity. For example, if eviction policy plug-ins 325 determine that a particular cached object is to be evicted, eviction policy plug-ins 325 may notify cache monitor 315 to this effect and then cache monitor 315 may update shared memory 125 with new cache status information 140. Similarly, if storage plug-ins 320 access one of cached objects 220 and 230, then storage plug-ins 320 may notify cache monitor 315 to this effect and then cache monitor 315 may update shared memory 125 with new cache status information 140. It should be appreciated that the monitoring activities of cache monitor 315 is generally conducted unbeknownst to applications 130 and without their direct involvement.

In one embodiment, when cache manager 225 is instantiated for each cache created for one of applications 130, a different cache region of cache implementation 310 is created. This cache region may include a cache facade for accessing the particular cached objects 220 or 223 associated with the particular cache instantiation. Other instantiation implementations are possible. In one embodiment, a signal cache implementation 310 and a single cache monitor 315 monitor all caches within a single JVM™ 120. In an alternative embodiment, each cache is managed and monitored by its own instance of cache implementation 310 and cache monitor 315.

FIG. 4 illustrates a table 400 that depicts cache status information 140 that may be stored within cache monitoring tables of each reporting slot S1-SN of shared memory 125, in accordance with an embodiment of the invention. It should be appreciated that table 400 is not intended to be an exhaustive list of possible cache status information 140, but rather examples of such information. Cache monitoring table 400 illustrates 15 different status indicators with corresponding descriptions.

In one embodiment, all cache status information 140 corresponding to a single local cache 205 or shared cache 210 is maintained within a data structure (e.g., cache monitoring table, etc.) stored to one of reporting slots S1-SN. Upon deletion of a particular cache, the corresponding reporting slot S1-SN is cleaned, and the memory reclaimed for use by a later created cache or for other purposes. Accordingly, shared memory 125 provides a snapshot of the current status of all local and shared caches 205 and 210 in all JVM™s 120 of AS instance 115. This snapshot may be periodically (or on demand) transferred to monitoring console 110 via network interface 215. In one embodiment, if longer records are desired, cache status information 140 may be output into log files at AS instance 105 or by monitoring console 110.

Figure 5:
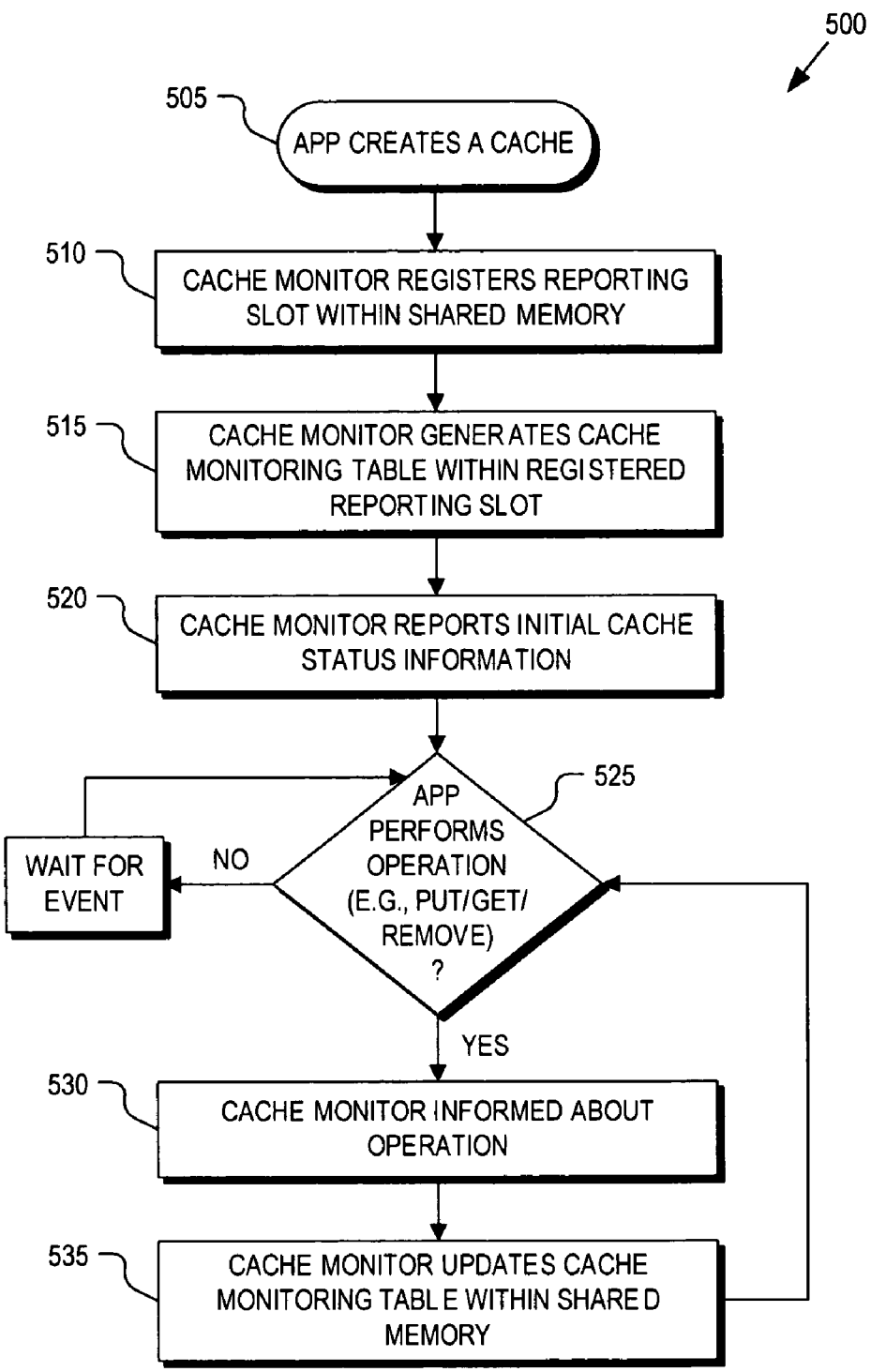
FIG. 5 is a flow chart illustrating a process for monitoring caches associated with a JAVA™ virtual machine, in accordance with an embodiment of the invention.

FIG. 5 is a flow chart illustrating a process 500 for monitoring caches associated with JVM™s 120, in accordance with an embodiment of the invention. In a process block 505, one of applications 130 creates a new cache (either local cache 205 or shared cache 210) to cache objects 220 or 223 therein. In one embodiment, creating a new cache may be thought of as creating a new cache region. Upon creation of a new cache (local or shared), cache monitor 315 registers/reserves a reporting slot within shared memory 125 (process block 510) and generates a new cache monitoring table within the registered reporting slot (process block 515). With reference to FIG. 4, the cache monitoring table may be initially populated with cache status information 140 such as ID, TYPE, NAME, and UPDATE_TIME while the remainder of the cache monitoring table may simply be set to initial values, NULL values, or zero (process block 520).

As soon as the particular application 130 performs a cache operation (e.g., PUT, GET, REMOVE, EVICT, MODIFY, etc.) on its cache (decision block 525), then process 500 continues to a process block 530. Otherwise, cache monitor 315 waits for a cache event to occur. In process block 530, cache monitor 315 is notified of the recent cache activity by the corresponding entity (e.g., cache implementation 310, storage plug-ins 320, eviction policy plug-ins 325, etc.). In one embodiment, the cache operations are performed by cache methods which are instrumented with reporting functionality to inform cache monitor 315 of their activities each time they are invoked. In a process block 535, cache monitor 315 reports new cache status information 140 into the corresponding reporting slot. The new cache status information 140 may update any of the cache status indicators listed in the left column of table 400, as well as others, that are modified by the recent cache activity by the particular application 130 (or other entities). Upon reporting new cache status information 140, process 500 returns to decision block 525 to await the next cache access event. In other embodiments, cache monitor 315 may periodically examine local caches 205 and shared caches 210 and automatically update shared memory 125.

Figure 6:
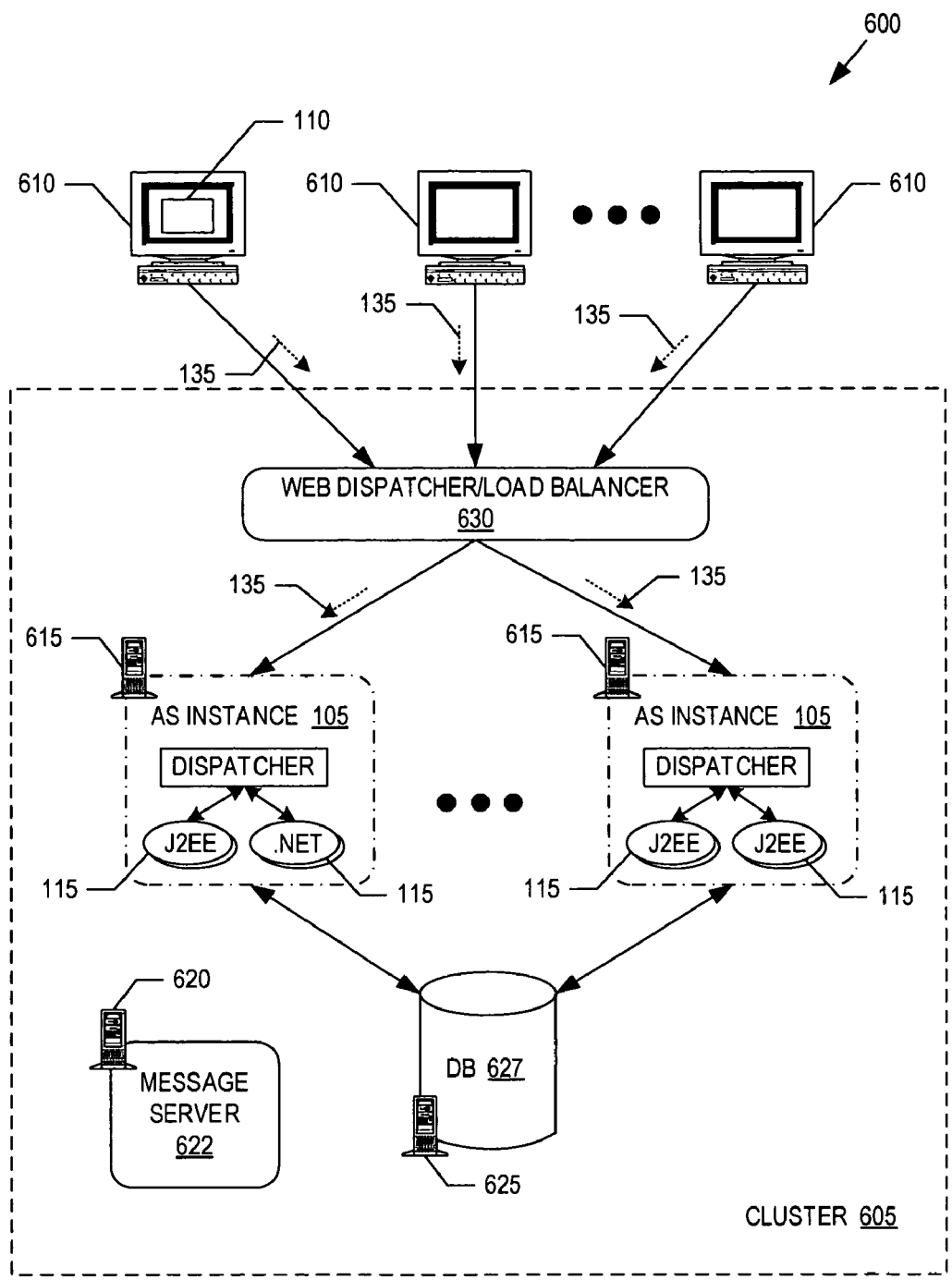
FIG. 6 is a block diagram illustrating a demonstrative enterprise environment for implementing embodiments of the invention.

FIG. 6 is a block diagram illustrating a demonstrative enterprise environment 600 for implementing embodiments of the invention. The illustrated embodiment of enterprise environment 600 includes a cluster 605 coupled to service work requests 135 from client nodes 610. Cluster 605 may include one or more server nodes 615 each supporting one or more AS instances 105, a message server node 620 supporting a message server 622, a database node 625 supporting a database 627, and a web dispatcher 630.

AS instances 105 may be web application servers, such as Web AS by SAP, .NET™ by Microsoft, or the like. As discussed above, each AS instance 105 may include one or more worker nodes 115 to operate JAVA™ programs 130 and service work requests 135. It should be appreciated that various components of AS instances 105 have been excluded from FIG. 6 for the sake of clarity and so as not to obscure the invention. In one embodiment, worker nodes 115 may be compliant with the J2EE™ standard. In one embodiment, worker nodes 115 may be compliant with the .NET™ framework from Microsoft. Each AS instance 105 may even include worker nodes 115 compliant with both the J2EE™ standard and the .NET™ framework.

Web dispatcher 630 implements a load-balancing mechanism distributing work requests 135 from client nodes 610 among server nodes 615 within cluster 605. For example, web dispatcher 630 may implement a round-robin load-balancing mechanism or the like. Web dispatcher 630 may be one of server nodes 615 having the task of dispatching work requests 135 among server nodes 615 of cluster 605 or a stand alone hardware node. Work requests 135 are processed by server nodes 615 and may subsequently be provided to database node 625. Database node 625 offers up the requested data to server nodes 615, which in turn process and format the results for display on client nodes 610. Each AS instance 105 may further include its own dispatcher mechanism to distribute work requests 135 assigned to it among its individual worker nodes 115.

JAVA™ programs 130 (see FIG. 1) executed by worker nodes 115 within AS instances 105 may collectively provide the logic for implementing various sub-layers (e.g., business layer, integration layer, presentation layer, etc.) of AS instances 105. For example, JAVA™ programs 130 may be servlets providing server-side logic to generate graphical user interfaces ("GUIs") on clients nodes 610 and may further include JAVASERVER PAGES™ ("JSP™") extensions for providing dynamic content within the GUI. JAVA™ programs 130 may further include business applications providing the business logic of an ENTERPRISE JAVABEANS™ ("EJB™"), and on client nodes 610 may be applets providing client side logic, and the like.

One of client nodes 610 may execute monitoring console 110 to provide remote monitoring of AS instances 105, and in particular, remote monitoring of each local cache 205 within each of JVM™s 120 and shared cache 210. If an IT technician notices that one of the local caches 205 or shared cache 210 has a low hit rate, has low utilization, is unusually large, or otherwise errant or unusual, the IT technician can take appropriate action including terminating the errant JAVA™ application 130 that created the problematic cache, resetting the problematic JVM™ 120 executing the errant JAVA™ application 130, or take other appropriate remedial action. Furthermore, tracking the cache usage of each local cache 205 and shared cache 210 may be used for a variety of purposes including, programming more efficient JAVA™ applications 130, improving JVM™s 120, hunting down software bugs, and the like.

Figure 7:
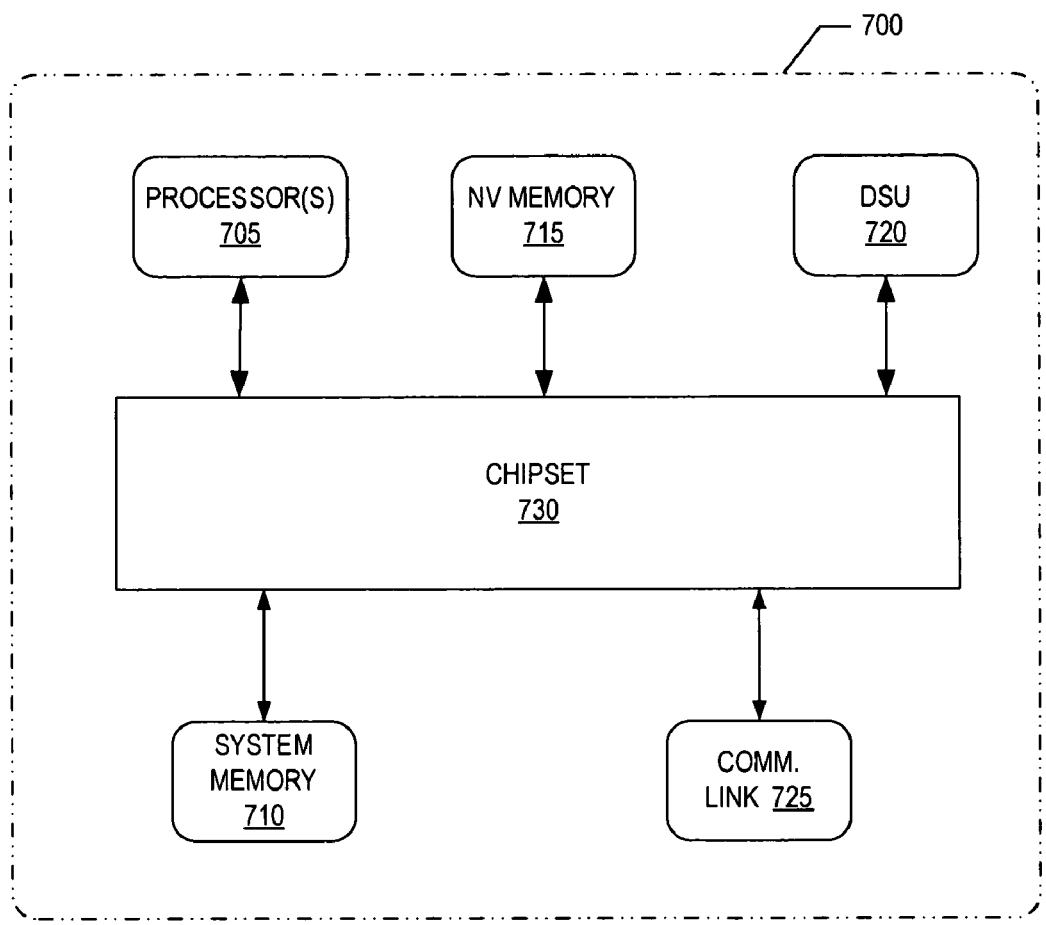
FIG. 7 illustrates a demonstrative processing system for implementing embodiments of the invention.

FIG. 7 is a block diagram illustrating a demonstrative processing system 700 for executing any of AS instance 105, monitoring console 110, process 500, or implementing any of client nodes 610, server nodes 615, message server node 620, or database node 625. The illustrated embodiment of processing system 700 includes one or more processors (or central processing units) 705, system memory 710, nonvolatile ("NV") memory 715, a DSU 720, a communication link 725, and a chipset 730. The illustrated processing system 700 may represent any computing system including a desktop computer, a notebook computer, a workstation, a handheld computer, a server, a blade server, or the like.

The elements of processing system 700 are interconnected as follows. Processor(s) 705 is communicatively coupled to system memory 710, NV memory 715, DSU 720, and communication link 725, via chipset 730 to send and to receive instructions or data thereto/therefrom. In one embodiment, NV memory 715 is a flash memory device. In other embodiments, NV memory 715 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM") static RAM ("SRAM"), and the like. DSU 720 represents any storage device for software data, applications, and/or operating systems, but will most typically be a nonvolatile storage device. DSU 720 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 720 is illustrated as internal to processing system 700, DSU 720 may be externally coupled to processing system 700. Communication link 725 may couple processing system 700 to a network such that processing system 700 may communicate over the network with one or more other computers. Communication link 725 may include a modem, an Ethernet card, a Gigabit Ethernet card, Universal Serial Bus ("USB") port, a wireless network interface card, a fiber optic interface, or the like.

It should be appreciated that various other elements of processing system 700 have been excluded from FIG. 7 and this discussion for the purposes of clarity. For example, processing system 700 may further include a graphics card, additional DSUs, other persistent data storage devices (e.g., tape drive), and the like. Chipset 730 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 730. Correspondingly, processing system 700 may operate without one or more of the elements illustrated. For example, processing system 700 need not include DSU 720.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Process 500 explained above is described in terms of computer software and hardware. The techniques described may constitute machine-executable instructions embodied within a machine (e.g., computer) readable medium, that when executed by a machine will cause the machine to perform the operations described. Additionally, process 500 may be embodied within hardware, such as an application specific integrated circuit ("ASIC") or the like. The order in which some or all of the process blocks appear in process 500 should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. In some examples above, well-known structures, materials, or operations are not shown or described in detail to avoid obscuring certain aspects. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    operating at least two worker nodes within an application server ("AS") instance, each of the worker nodes providing a run-time environment for a virtual machine ("VM") having a local cache, the AS instance including a network interface and a shared memory external to and shared by the network interface and the at least two worker nodes; and
    for each of the VMs of the at least two worker nodes,
        executing a program on the VM,
        caching an object within the local cache of the VM, the caching by the program executing on the VM,
        generating by the VM, cache status information about the local cache of the VM, the cache status information indicating a status of the corresponding local cache of the VM which results from the caching of the object, and
        exporting the generated cache status information from the VM into the shared memory external to the VM during operation of the program.

2. The method of claim 1, wherein the exporting the generated cache status information is in response to the caching of the object within the local cache of the VM.

3. The method of claim 1, further comprising:
    receiving a request for the cache status information;
    retrieving the cache status information from the memory external to the VM; and
    transmitting the cache status information via the network interface to a monitoring console to display the cache status information, the monitoring console being external to the AS instance.

4. The method of claim 1, further comprising:
    registering reporting slots within the shared memory, each one of the reporting slots corresponding to one of the multiple local caches; and
    wherein exporting the cache status information for the local cache of each VM comprises reporting the cache status information for each of the multiple local caches into a corresponding one of the reporting slots.

5. The method of claim 4, wherein each of the reporting slots includes a cache monitoring table to store the cache status information corresponding to one of the local caches, the cache status information including at least a total size of the objects cached within the one of the local caches, a total number of the objects cached within the one of the local caches, and cache utilization statistics.

6. The method of claim 4, further comprising:
    caching shared objects within a shared cache accessible by two or more applications of the AS instance;
    generating shared cache status information about the shared cache; and
    exporting the shared cache status information into the shared memory in response to an operation performed on one of the shared objects.

7. The method of claim 1, wherein the local cache comprises a local cache internal to the VM and created for the program.

8. A machine-readable medium having stored thereon instructions that, if executed by a machine, will cause the machine to perform a method comprising:
    operating at least two worker nodes within an application server ("AS") instance, each of the worker nodes providing a respective run-time environment for a virtual machine ("VM") having a local cache, the AS instance including a network interface and a shared memory external to and shared by the network interface and the at least two worker nodes;
    for each VM,
        executing a program on the each VM,
        caching an object within the local cache of the each VM, the caching by the program executing on the each VM; and
        generating by the each VM, cache status information about the local cache of the each VM, the cache status information indicating a status of the local cache of the each VM which results from the caching by the program executing on the each VM; and
    exporting the cache status information for each of the local caches from the multiple VMs into shared memory external to the multiple VMs.

9. The machine-readable medium of claim 8, wherein each exporting of cache status information is in response to a corresponding caching of an object within a local cache of a VM.

10. The machine-readable storage medium of claim 8, the method further comprising:
    receiving a request for the cache status information;
    retrieving the cache status information from the shared memory; and
    transmitting the cache status information via the network interface to a remote monitoring console to display the cache status information, the remote monitoring console being external to the AS instance.

11. The machine-readable medium of claim 8, the method further comprising:
registering reporting slots within the shared memory, each one of the reporting slots corresponding to one of the local caches; and
wherein exporting the cache status information for each of the local caches comprises reporting the cache status information for each of the local caches into a corresponding one of the reporting slots.

12. The machine-readable medium of claim 11, wherein each of the reporting slots includes a cache monitoring table to store the cache status information corresponding to one of the local caches, the cache status information including at least a total size of the objects cached within the one of the local caches, a total number of the objects cached within the one of the local caches, and cache utilization statistics.

13. The machine-readable medium of claim 11, the method further comprising:
caching shared objects accessible by two or more applications within a shared cache, the two or more applications operating within different VMs of the AS instance;
generating shared cache status information about the shared cache; and
exporting the shared cache status information into the shared memory in response to an operation performed on one of the shared objects.

14. A system, comprising:
at least two worker nodes of an application server ("AS") instance, each worker node to provide an execution environment for a respective virtual machine ("VM"), each VM to operate a respective program, each VM including,
a local cache to cache an object, wherein the program initiates the caching of the object, and
a cache manager to collect cache status information indicating a status of the local cache which results from the caching of the object, the cache manager further to export the cache status information external to the VM during operation of the program;
a memory buffer of the AS instance external to the worker nodes, the memory buffer to store the cache status information collected by the cache manager;
a network interface of the AS instance to access the memory buffer and to retrieve the cache status information therefrom; and
a monitoring console communicatively coupled to the network interface to receive the cache status information from the network interface and to display the cache status information.

15. The system of claim 14, wherein the memory buffer comprises a shared memory including reporting slots, each reporting slot to store cache status information associated with caches of each of the plurality of VMs and received in real-time from each of the plurality of VMs.

16. The system of claim 14, wherein the cache status information includes at least a total size of the objects cached within each of the local caches of the VMs, a total number of the objects cached within each of the local caches of the VMs, and cache utilization statistics of each of the local caches of the VMs.

* * * * *